Jan. 27, 1931.  O. T. NICHOL  1,790,280
ROTARY COMBUSTION ENGINE
Filed March 27, 1929  3 Sheets-Sheet 3
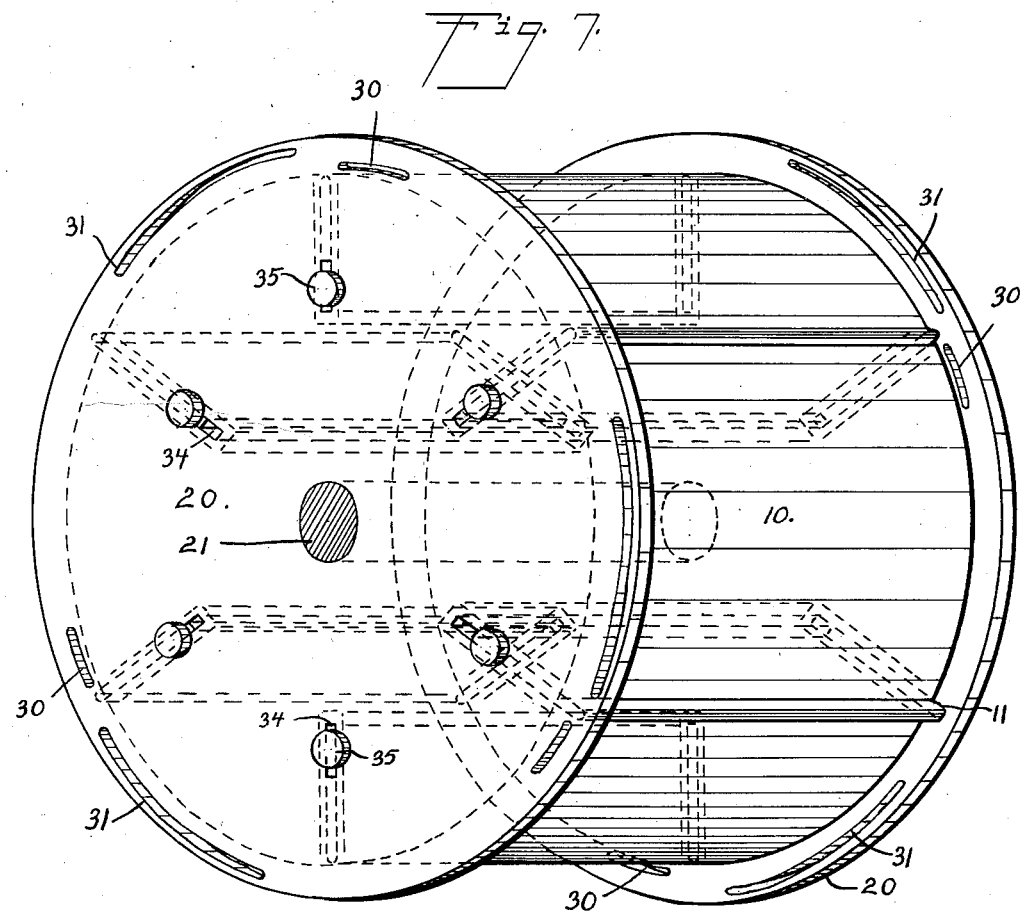
Fig. 7.
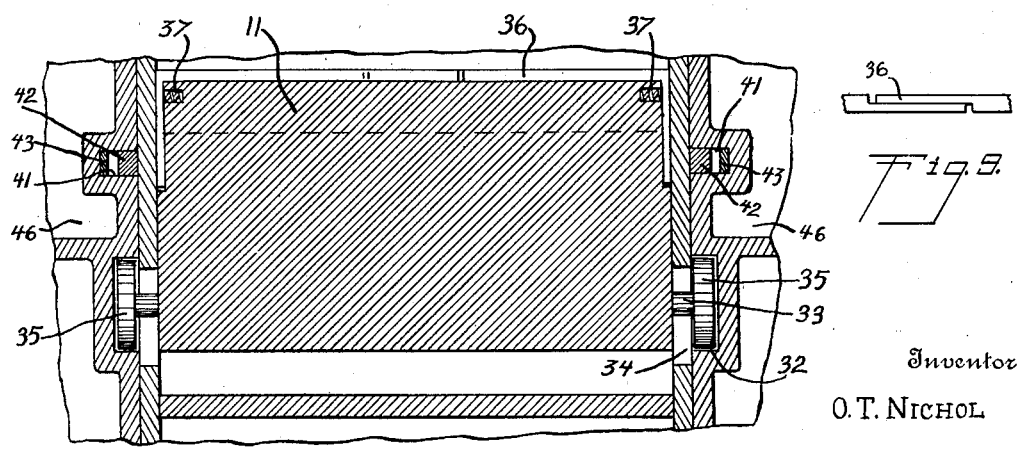
Fig. 8.  Fig. 9.
Inventor
O. T. NICHOL
By 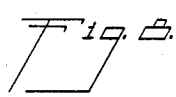
Attorney Patented Jan. 27, 1931

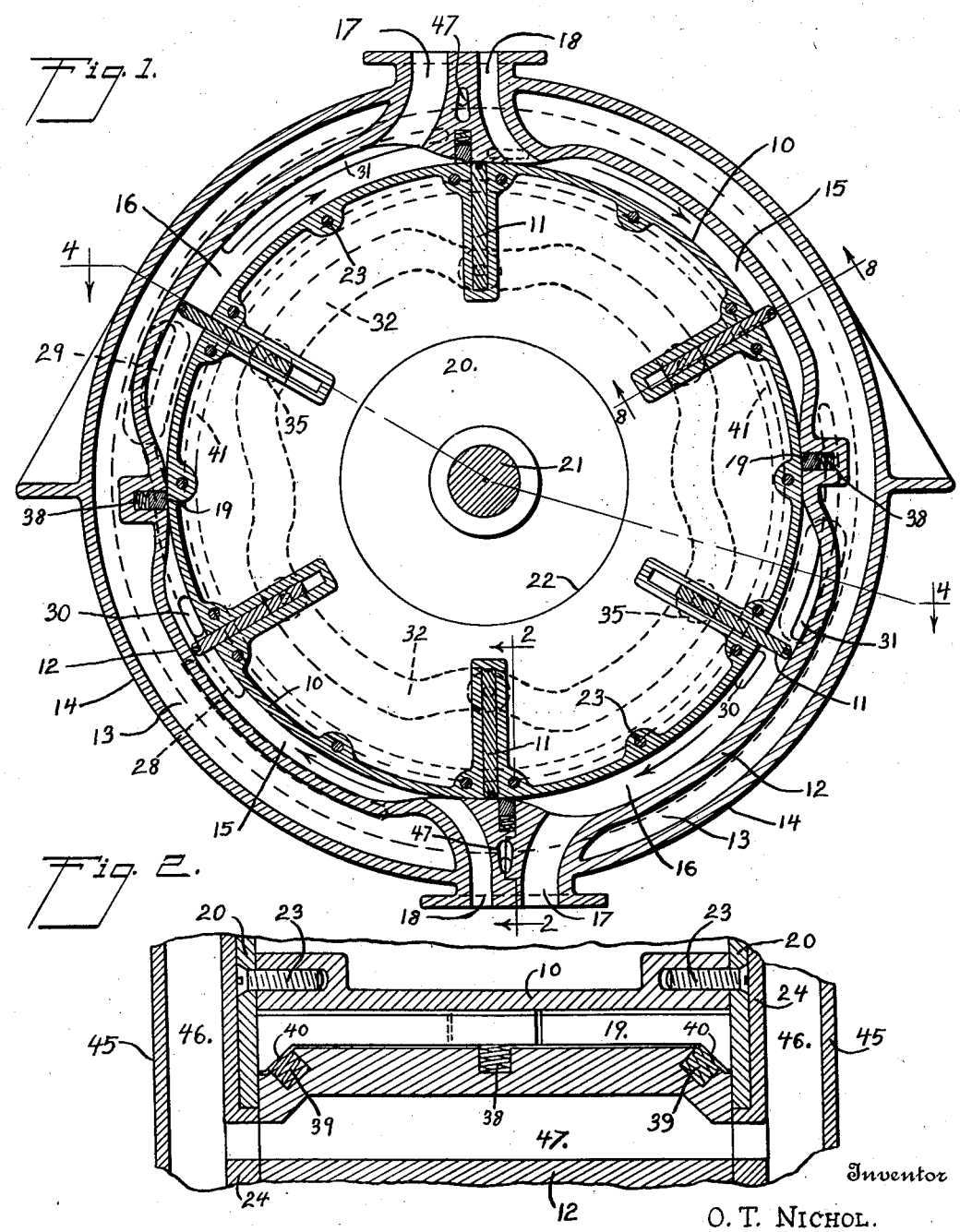

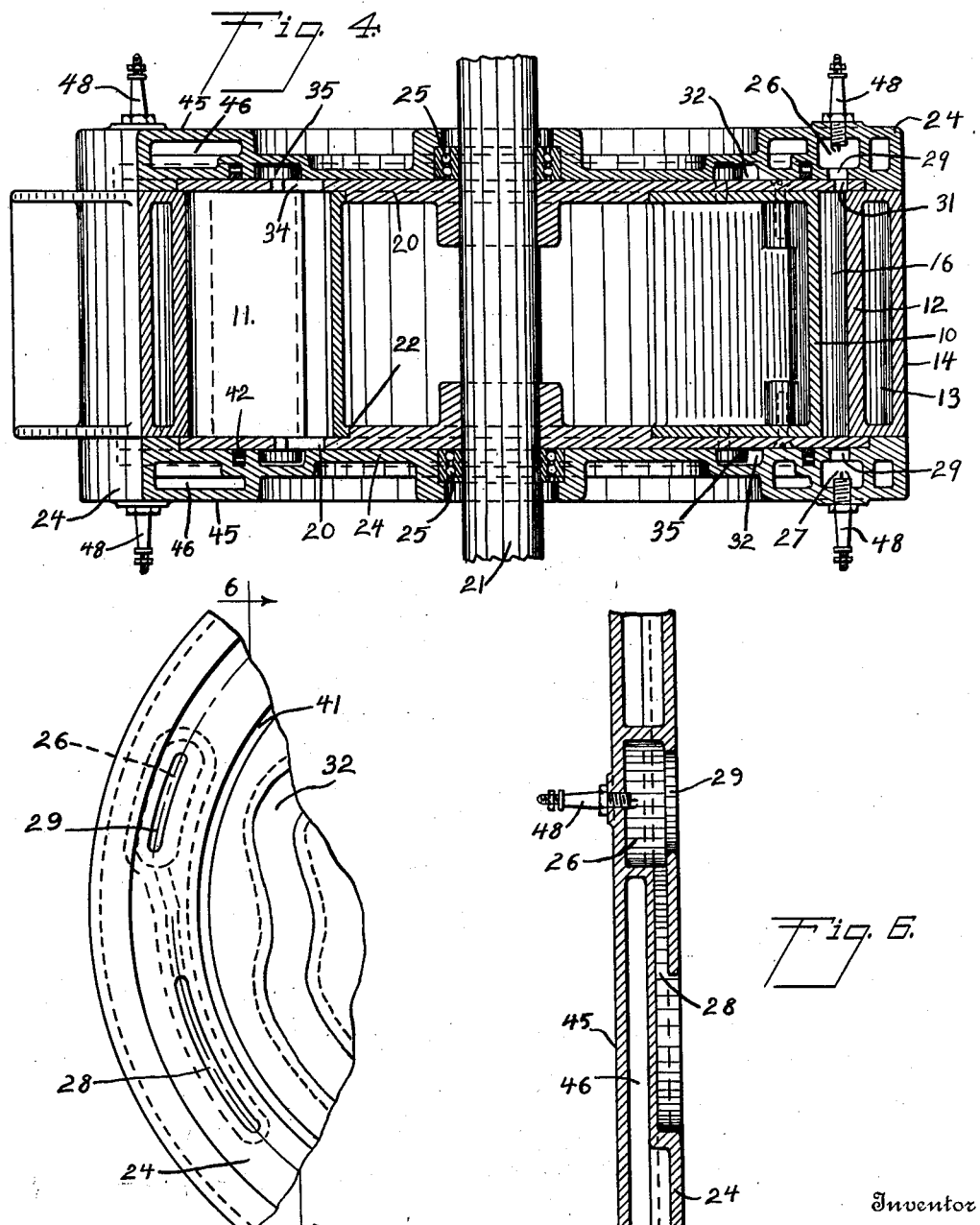

1,790,280

UNITED STATES PATENT OFFICE

ORR T. NICHOL, OF OMAHA, NEBRASKA, ASSIGNOR OF ONE-HALF TO LOYAL B. COHN, OF OMAHA, NEBRASKA

ROTARY COMBUSTION ENGINE

Application filed March 27, 1929. Serial No. 350,315.

My invention relates to rotary combustion engines of the class wherein a rotor has slidably mounted therein one or more piston-plates which are movable radially of the rotor to maintain contact with the interior surface of a stationary casing surrounding the rotor, said interior surface of the casing being contoured to provide chambers which are traversed by the piston-plates to induct the combustible charge, to compress the same, to receive the expansive force of the ignited charge, and to scavenge or eject the burned charge. It is the object of my invention to provide an engine of this class having, separate from the working-chambers traversed by the piston-plates, combustion-chambers into which the compressed charges may be delivered from the working-chambers, and from which the ignited charges may be expanded into the working-chambers; to provide valve-mechanism controlling the delivery of the charges to the combustion-chambers and the discharge of the same therefrom; and to so arrange and co-ordinate the working-chambers, combustion-chambers and valve-mechanism that each piston-plate during its traversal of one working-chamber causes the induction of a fresh charge behind it simultaneously with the compression of a charge ahead of it, and during its traversal of the succeeding working-chamber receives the expanding ignited charge behind it while expelling a burned and expanded charge and thus scavenging the portion of the chamber ahead of it. A further object of my invention is to provide in the foregoing structure valve-means fixedly associated with the rotor and forming the sides of the working-chambers. A further object is to provide an arrangement of the moving parts of the structure such that said parts will be constantly in balance about the axis of rotation. More specific objects of my invention will be set forth hereinafter.
An engine embodying my invention is illustrated in the accompanying drawings, in which Fig. 1 is a section thereof on a plane transverse to the axis of rotation, Fig. 2 is a detail section on the line 2—2 of Fig. 1, Fig. 3 is a detail plan view of portions of the rotor-packing, Fig. 4 is a section on the planes indicated by the line 4—4 of Fig. 1, Fig. 5 is a detail elevation of the inner side of a portion of an end-plate or head of the casing, Fig. 6 is a section on the line 6—6 of Fig. 5, Fig. 7 is an isometric view of the rotor and its associated parts, Fig. 8 is a detail section on the line 8—8 of Fig. 1, and Fig. 9 is a detail edge view of portions of the piston-packing bars.

In the illustrated embodiment of my invention I provide a cylindrical rotor 10 having in its outer portion a plurality of radially and axially extending guide-ways in which are slidably disposed the flat piston-plates 11. The casing 12, which surrounds the rotor, has an integral jacket 14 inclosing a water-space 13, as shown, and the inner surface of the casing is contoured to form, between the same and the cylindrical surface of the rotor, the compression-chambers 15 and expansion-chambers 16. From one end of each expansion-chamber an exhaust-port 17 extends outwardly through the casing, and at the opposite ends of the compression-chambers 15 are similarly provided the intake or suction-ports 18. At points peripherally intermediate the chambers 15 and 16, the casing is contoured to substantially contact with the cylindrical surface of the rotor, and at said contact-points the packing-bars 19 are provided for preventing leakage circumferentially between said chambers. The rotor is carried upon a pair of parallel valve-plates 20 of which the hub-portions are secured upon the shaft 21, said shaft being concentric with the rotor, the plates 21 having annular shoulders 22 which fit within the end-portions of the rotor, and the plates and rotor being secured together by a plurality of screws 23, as shown.

The outer sides and peripheral portions of the valve-plates are inclosed by the end-plates or heads 24 of the casing, said heads carrying at the centers thereof the bearings 25 in which the shaft 21 is journaled. The valve-plates 20 are of such diameter as to extend out past the chambers 15 and 16 and overlap the sides of the casing-body 12, as shown at the right-hand end of Fig. 4. The radial extent of the expansion-chambers 16 is greater than that of the compression-chambers 15, and the valve-plates inclose the sides of said chambers, being interposed between the same and the inner sides of the heads 24 of the casing. In said heads 24, at positions near the contiguous ends of the compression-chambers and expansion-chambers, are formed the combustion-chambers of which, in the illustrated structure, there are two in each head, at diametrically opposite positions, the chambers in one head being designated as 26, and those in the other head being designated as 27. Each combustion-chamber has an inlet-port 28 and a discharge-port 29 communicating therewith, the port 29 passing directly through the inner wall of the head 24 to the face thereof which is engaged by the valve-plate 20, and the port 28 extending from the chamber first parallel with said inner wall and then laterally through same to the valve-engaged inner face, as best shown in Figs. 5 and 6. The openings of the ports 28 and 29 at the valve-engaged face of the head are curved concentrically with the rotor-axis, and the ports 28 are at a smaller radial distance from said axis than the ports 29. In the valve-plates 20 are ports 30 adapted to register with the inlet-ports 28, said ports 30 in each valve-plate being positioned immediately ahead of the alternate piston-plates 11, and immediately behind the respective piston-plates are ports 31 adapted to register with the discharge-ports 29 of the combustion-chambers. By reason of the different radial spacing of the inlet and discharge ports, the valve-ports 30 do not come into register with the ports 29, nor do the valve-ports 31 come into register with the ports 28. The ports 31 communicate with the expansion-chambers while passing the same, but by reason of said ports 31 being positioned radially outward of the compression-chambers, the same do not come into communication with the latter chambers at any time. By reason of the alternating arrangement of the ports 30 and 31 in the two valve-plates 20, there is provided, for each section of the rotor intermediate an adjacent pair of the piston-plates, a port 30 through the valve-plate at one side, and a port 31 through the valve-plate at the other side, as will be clearly apparent in Fig. 7.

The radial movements of the piston-plates are controlled by cam-tracks 32 formed integrally with the heads 24 of the casing, each piston-plate having at the ends thereof pins 33 which extend through radial slots 34 in the valve-plates, the portions of said pins which protrude from the valve-plates having rollers 35 mounted revolubly thereon and moving within the cam-tracks 32, which are contoured to maintain the outer edges of the piston-plates substantially in contact with the contoured inner surface of the casing 12 at all times. Said outer edges of the piston-plates are preferably provided with packing means as shown in Figs. 8 and 9, the outer edge and parts of the ends of each plate being grooved to receive slidably a pair of L-shaped packing-bars 36, the adjacent ends of said bars being shouldered and overlapped as represented in Fig. 9, and each bar being pressed laterally against the adjacent valve-plate 20 by means of a spring 37 arranged as shown in Fig. 8. Centrifugal force, resulting from the movement of the rotor, serves to move the packing-bars 36 outwardly to maintain contact between the same and the casing 12. The packing-bars 19, which are arranged in the abutment portions of the casing intermediate the chambers 15 and 16, are bevelled at the edges thereof which are first engaged by the piston-plates, whereby to facilitate the entry of said plates and the packing-bars 36 beneath said bars 19. The bars 19 are of the form shown in detail in Figs. 2 and 3, having overlapped adjoining end-portions beneath which is arranged a spring 38 for pressing the same toward the rotor, and springs 39 being arranged to engage the inclined inner faces 40 of the end-portions of the bars, whereby to press the same laterally toward the valve-plates and also inwardly toward the rotor.

In the heads 24 of the casing, radially inward of the ports 28 and 29, are annular grooves 41 in which are disposed packing-rings 42, said rings being pressed inwardly against the adjoining sides of the valve-plates 20 by means of flat springs 43 disposed in the grooves at the closed sides thereof. The heads 24 are provided with integral jackets 45 extending about the peripheral portions thereof and providing water-spaces 46 which are connected with each other by water-ports 47 extending transversely through the casing-body 12 intermediate the exhaust and suction ports 17 and 18, as best shown in Figs. 1 and 2.

Suitable means, such as the spark-plugs 48, are provided for ignition of the combustible charges in the chambers 26 and 27, and the control and timing of the ignition may be effected in any desired and well-known manner. In the operation of the engine, the rotor 10 moves in a clockwise direction as viewed in Fig. 1, so that the chambers 15 and 16 are traversed by the piston-plates in the direction of the arrows shown therein in Fig. 1, the piston-plates moving from the suction-ports 18 while traversing the compression-chambers 15, and moving toward the exhaust-ports 17 while traversing the expansion-chambers 16. The intake or suction-ports 18 are connected with a suitable carbureter or other source of combustible charge, so that as each piston-plate traverses a compression-chamber 15 a charge is drawn into the chamber and is trapped therein as the next piston-plate passes the suction-port. The charge so trapped in a chamber 15 is compressed by the movement of the following piston-plate as the same approaches the closed end of the chamber, and when the port 30 communicating with the respective inter-piston space comes into register with the corresponding port 28 the compressed charge is delivered to the combustion-chamber 26 or 27, as the case may be.

The compressed charge in a combustion-chamber is ignited while the piston-plate which forced the charge into the chamber is passing the casing-abutment between the adjoining ends of the compression-chamber and expansion-chamber, and as the piston-plate enters the expansion-chamber the port 31 comes into register with the discharge-port 29 of the combustion-chamber, whereby the ignited charge is delivered into the chamber 16 behind the piston-plate and, by expansion, actuates the piston until the latter reaches the exhaust-port 17, after which the expanded charge is free to escape through said port. The residue of the expanded charge is swept out and the expansion chamber fully scavenged by the following piston as it traverses the expansion chamber.

It will be seen that by the provision of the two combustion-chambers 26 and 27 for each pair of the working-chambers 15 and 16, and the arrangement of the ports 30 and 31 so that the said combustion-chambers are connected alternately with the successive inter-piston spaces, each piston, during its traversal of a compression-chamber and the next adjacent expansion-chamber, participates in a complete cycle of operations, the piston inducting a fresh charge behind it and compressing a charge ahead of it during its traversal of the chamber 15, and receiving impetus from the expanding charge behind it and scavenging the portion of the chamber ahead of it while traversing the chamber 16. Thus in an engine of the illustrated structure, having six piston-plates and two pairs of working-chambers, the rotor during each revolution thereof will receive the impetus from expansion of twelve charges. It will be noted also that, by the symmetry of arrangement of the parts about the axis of rotation, the moving parts will be constantly in balance about said axis. Obviously, the number of pairs of working-chambers, and combustion-chambers, and the number of piston-plates carried by the rotor, may be varied without departing from the spirit of my invention.

Now, having described my invention, what I claim and desire to secure by Letters Patent is:

1. In a combustion engine, a cylindrical rotor, a casing surrounding said rotor, said casing contacting with the rotor at circumferentially spaced portions and being recessed intermediate said contacting portions to provide alternate compression-chambers and expansion-chambers, piston-plates carried by the rotor and movable radially thereof to maintain contact with the casing and traverse said compression and expansion chambers during rotation of the rotor, the casing having intake and exhaust ports communicating respectively with the remote opposite ends of the compression and expansion chambers, there being pairs of combustion-chambers formed in the casing near the contiguous ends of the compression and expansion chambers, and valve-plates carried by the rotor and controlling ports for admitting charges to the combustion-chambers alternately from each compression-chamber and for delivering the respective charges from the combustion-chambers to the adjacent expansion-chamber.

2. In a combustion engine, the combination with a rotor, a casing surrounding said rotor and contacting therewith at peripherally spaced portions thereof and recessed intermediate said contacting portions to provide alternate compression-chambers and expansion-chambers, and a plurality of piston-plates carried by said rotor and movable radially thereof to follow the casing-contour and traverse the several chambers successively, there being intake ports for admitting charges to the compression-chambers behind each piston-plate traversing the same, and ports for the escape of exhaust from the expansion-chambers ahead of each piston-plate traversing said chambers; of means forming a pair of combustion-chambers for each compression-chamber, means for directing into said combustion-chambers alternately the charges compressed ahead of the successive piston-plates traversing the respective compression-chamber, and means for delivering the charges from the combustion-chambers to the expansion-chambers behind the same piston-plates by which the respective charges are compressed.

3. In an engine of the class described, a cylindrical rotor, a casing-body surrounding said rotor and engaging the same at circumferentially spaced portions thereof, said body being recessed intermediate said portions to provide alternate compression-chambers and expansion-chambers, piston-plates mounted in said rotor to slide radially thereof and traverse said chambers successively during rotation of the rotor, valve-plates secured to the ends of the rotor and extending radially outward therefrom to overlap the recessed portions of the casing-body and inclose the sides of said chambers, the compression-chambers being of lesser radial extent than the expansion-chambers and said valve-plates having ports arranged radially outward of the compression-chambers and adapted to communicate with the expansion-chambers while passing the same, the casing-body having suction-ports communicating with the ends of the compression-chambers first traversed by the piston-plates and having exhaust-ports communicating with the ends of the expansion-chambers last traversed by the piston-plates, heads secured to the casing-body and inclosing the valve-plates, said heads each having therein a combustion-chamber near the adjoining ends of each pair of the compression-chambers and expansion-chambers, the valve-plates having ports controlling admission of charges from the compression-chambers to the combustion-chambers, and there being ports communicating with the combustion-chambers and adapted to register with the first-named ports of the valve-plates to deliver charges to the expansion-chambers.

4. In an engine of the class described, a cylindrical rotor, a pair of valve-plates secured to the ends and extending radially outward of said rotor, a casing having a body-portion fitting between said valve-plates and contacting with the rotor at circumferentially spaced portions thereof, said casing-body being recessed intermediate said contacting portions to form alternate compression and expansion chambers inclosed laterally by the valve-plates, piston-plates carried by the rotor and movable radially thereof to maintain contact with the casing and traverse the successive compression and expansion chambers, there being suction-ports for admitting charges behind each piston-plate traversing the compression-chambers and ports for the escape of exhaust from the expansion-chambers ahead of each piston-plate traversing the same, heads secured on the ends of the casing-body and inclosing the valve-plates, said heads having combustion-chambers formed therein, and said heads and the valve-plates having therein ports for delivering charges from the compression-chambers to the combustion-chambers and from the combustion-chambers to the expansion-chambers.

ORR T. NICHOL.